US005996767A

United States Patent [19]

Misawa

[11] Patent Number: 5,996,767

[45] Date of Patent: Dec. 7, 1999

[54] WHEELCHAIR TRANSPORTER FOR USE ON AN ESCALATOR AND AN ESCALATOR CONTROL SYSTEM FOR TRANSPORTING THE WHEELCHAIR TRANSPORTER ON THE ESCALATOR

[75] Inventor: Rintaro Misawa, Saitama-ken, Japan

[73] Assignee: Sunwa Ltd., Tokyo, Japan

[21] Appl. No.: 08/979,237

[22] Filed: Nov. 26, 1997

[30] Foreign Application Priority Data

Dec. 3, 1996 [JP] Japan .................................... 8-322630
Dec. 3, 1996 [JP] Japan .................................... 8-322631

[51] Int. Cl.[6] .............................. B66B 29/08; B62B 5/02; B62B 9/02

[52] U.S. Cl. .......................... 198/321; 198/324; 198/326; 280/5.32; 280/47.12; 280/47.41; 280/DIG. 10; 180/8.2

[58] Field of Search ..................................... 198/320, 321, 198/324; 280/5.2–5.32, 205, 47.12, 47.41, DIG. 10; 180/8.2

[56] References Cited

U.S. PATENT DOCUMENTS

| | | | |
|---|---|---|---|
| 4,176,851 | 12/1979 | Simonson et al. | 280/205 |
| 5,197,558 | 3/1993 | Misawa | 180/8.2 |
| 5,641,030 | 6/1997 | Toselli | 280/DIG. 10 |
| 5,868,402 | 5/1997 | Eguchi et al. | 280/DIG. 10 |

*Primary Examiner*—William E. Terrell
*Assistant Examiner*—Mark A. Deuble
*Attorney, Agent, or Firm*—Nikaido, Marmelstein, Murray & Oram, LLP

[57] ABSTRACT

A transporter main body has a pair of front wheels and a pair of rear wheels, each of which is adapted to contact with a step of an escalator, a resilient member connected to the bottom of the transporter main body, a mounting structure for mounting a wheelchair, and an extending/retracting device connected with one end of the mounting structure for pivoting the mounting structure in vertical direction. After a wheelchair is mounted on the mounting structure, the wheels allow the transporter main body to be wheeled on the escalator. The resilient member grips the steps of the escalator to allow the wheelchair to ascend or descend with the escalator.

11 Claims, 13 Drawing Sheets

FIG.2a-1
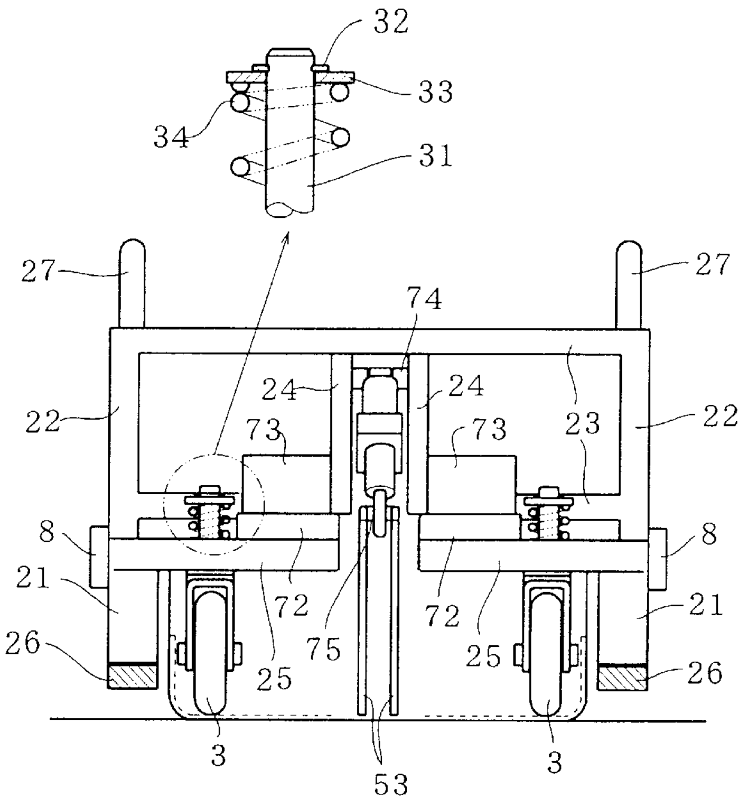
FIG. 2a
FIG.2b
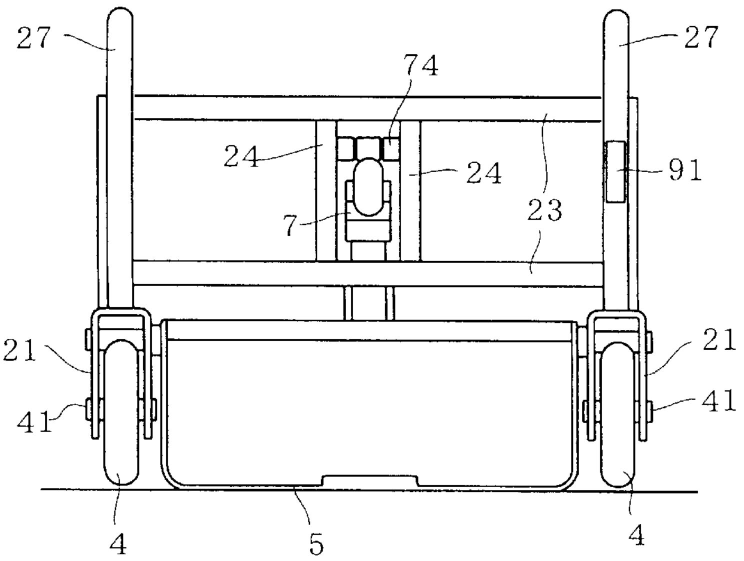

FIG.3a
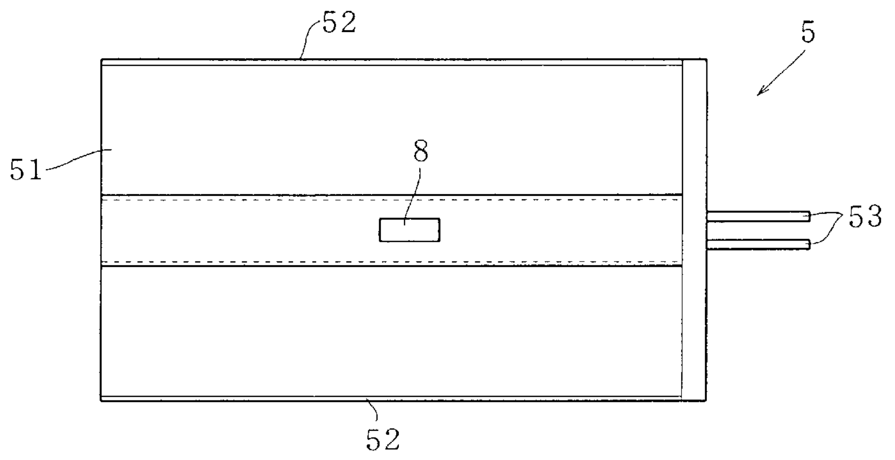
FIG.3b-1
FIG. 3b
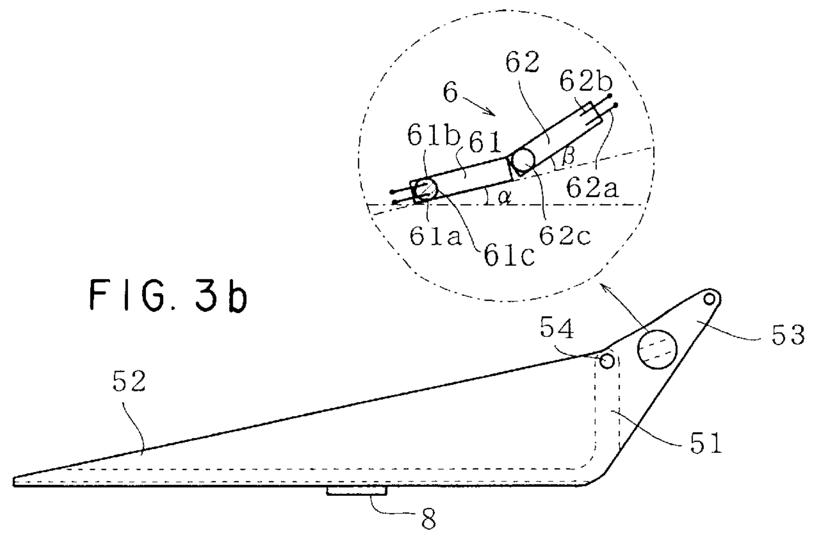
FIG.3c
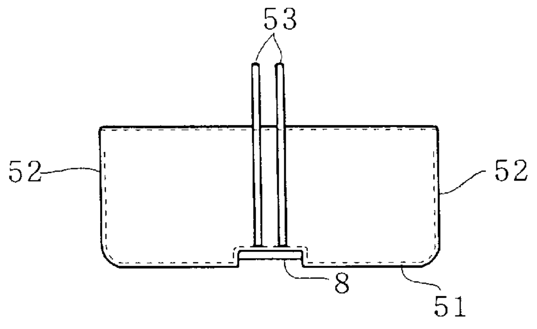

WHEELCHAIR TRANSPORTER FOR USE ON AN ESCALATOR AND AN ESCALATOR CONTROL SYSTEM FOR TRANSPORTING THE WHEELCHAIR TRANSPORTER ON THE ESCALATOR

BACKGROUND OF THE INVENTION

This invention relates to a wheelchair transporter for use on an escalator, also relates to an escalator control system for transporting the wheelchair transporter on the escalator.

With the development of welfare society, there have been suggested and produced many sorts of wheelchair transporters which can be used in an railway station or a school building to transport a wheelchair up or down a stairway. However, no one has thought of manufacturing a wheelchair transporter capable of transporting a wheelchair on an escalator.

In order to solve the above problem, Japanese Patent Application Laid-pen No. 7-125964 has suggested an escalator system for transporting a wheelchair, as shown in FIG. 11.

Referring to FIG. 11, the conventional escalator system 100 includes an entrance 102, an exit 104, a plurality of steps 110 connected continuously in an endless manner. There is an operation device 106 provided in the entrance 102, another operation device 108 provided in the exit 104.

When the escalator system 100 is to be used for transporting a wheelchair, the operation device 106 or the operation device 108 operates to have two adjacent steps 110, 110 combined into a large one-piece step so that a wheelchair may be mounted thereon. On the other hand, when the escalator system 100 is to be used for transporting common passengers, the one-piece step may be changed back into original two steps 110, 110.

However, there is a trouble with the above-described conventional escalator system 100. Namely, when the escalator is used to transport a wheelchair, the operating condition of the escalator has to be changed into wheelchair transporting mode, hence it is necessary to temporarily stop the transportation of common passengers.

After the transportation of the wheelchair is over, the operation mode has to be changed back into common operation mode so as to restart the transportation of common passengers. As a result, there is a relatively long time interval needed to stop the common use of the escalator for transporting common passengers, hence causing a great inconvenience in the daily use of such an escalator system.

SUMMARY OF THE INVENTION

It is therefor an object of the present invention to provide a wheelchair transporter particularly suitable for transporting a wheelchair on an escalator, ensuring that a wheelchair is transported up or down an escalator safely and smoothly.

It is another object of the present invention to provide an escalator control system for transporting the wheelchair transporter on an escalator without any necessity to temporarily stop the common use of the escalator for transporting common passengers, thereby eliminating a great inconvenience experienced in a conventional escalator system when transporting a wheelchair.

According to the present invention, there is provided a wheelchair transporter for transporting a wheelchair on an escalator, said transporter comprising: a transporter main body having a length extending over at least two steps on an escalator; a pair of front wheels adapted to get in contact with the bottom surface of a step on an escalator; a pair of rear wheels adapted to get in contact with the bottom surface of a step on an escalator; a mounting structure for mounting a wheelchair, said mounting structure being pivotably supported on the transporter main body by means of a pivoting shaft; an extending/retracting device connected with one end of the mounting structure for pivoting the mounting structure in vertical direction. Here, the front wheels and the rear wheels are adapted to run to cause the transporter to get on or off the escalator, whilst are separated from the steps of the escalator when the transporter is mounted on the escalator in an inclined position.

According to one aspect of the present invention, the transporter main body is adapted to be supported by corners of steps on an escalator when the transporter is mounted on the escalator in an inclined position.

According to another aspect of the present invention, the mounting structure is adapted to pivot in a vertical direction to an extent such that the bottom portion of the mounting structure is in an upwardly pivoted position beyond an horizontal line.

According to a further aspect of the present invention, the bottom surface of the transporter main body is covered by a resilient material having formed on the outer surface thereof a plurality of lugs which are disposed at a predetermined interval to properly engage with steps of an escalator.

According to a still further aspect of the present invention, the transporter main body has on the underside thereof at least one stopper, which is adapted to engage on a step near the corner thereof so as to prevent the transporter from moving on the escalator.

According to one more aspect of the present invention, each of the front wheels is a caster supported by a rotatable shaft, which is wound by a coil spring useful for maintaining the caster in a straightly advancable position.

According to a still further aspect of the present invention, the mounting structure is provided with an inclination sensor which is adapted to switch On or Off the extending/retracting device, corresponding to an inclined extent of the mounting structure. In particular, the inclination sensor includes a first inclination sensing element and a second inclination sensing element, each inclination sensing element is a tubular member containing a flowable electrically conductive material and a pair of electrically conductive terminals. In detail, the first inclination sensing element is inclined forming an angle $\alpha$ with a horizontal line on the mounting structure, preferably the angle $\alpha$ is 7'–9°. Meanwhile, the second inclination sensing element is inclined forming an angle $\beta$ with an extended line of the first inclination sensing element, preferably the angle $\beta$ is 7°–9°.

According to the present invention, there is also provided an escalator control system for transporting a wheelchair transporter on an escalator, said control system comprising: a first light emitting/detecting means provided at an entrance of the escalator; a second light emitting/detecting means provided at a position where a horizontal section has transited to an inclined section on the escalator; a third light emitting/detecting means provided at a position where the inclined section begins to transit to another horizontal section on the escalator, a fourth light emitting/detecting means provided at an exit of the escalator; a light reflecting means provided on the wheelchair transporter for reflecting a light emitted from one of the first to fourth light emitting/detecting means.

In operation of the escalator control system according to the present invention, a light emitted from the first light emitting/detecting means is reflected by the light reflecting means and the reflected light is detected by the first light emitting/detecting means so that the escalator speed is decelerated from its normal speed to a reduced speed; a light emitted from the second light emitting/detecting means is reflected by the light reflecting means and the reflected light is detected by the second light emitting/detecting means so that the escalator speed is accelerated from the reduced speed to its normal speed; a light emitted from the third light emitting/detecting means is reflected by the light reflecting means and the reflected light is detected by the third light emitting/detecting means so that the escalator speed is decelerated from its normal speed to a reduced speed; a light emitted from the fourth light emitting/detecting means is reflected by the light reflecting means and the reflected light is detected by the fourth light emitting/detecting means so that the escalator speed is accelerated from a reduced speed to its normal speed.

According to a still further aspect of the present invention, the first to fourth light emitting/detecting means are located on the left or right side wall of the escalator, the light reflecting means is located on left or right side of the wheelchair transporter.

Alternatively, the first light emitting/detecting means at the entrance of the escalator may be replaced by a manual switch.

According to one more aspect of the present invention, the first light emitting/detecting means is disposed on the bottom surface of the entrance of the escalator, the fourth light emitting/detecting means is disposed on the bottom surface of the exit of the escalator, the light reflecting means is disposed on the underside of the wheelchair transporter. Particularly, the first light emitting/detecting means is used to detect the entering of the wheelchair transporter on the escalator, the fourth light emitting/detecting means is used to detect the leaving of the wheelchair transporter from the escalator.

The above objects and features of the present invention will become more understood from the following description with reference to the accompanying drawings.

BRIEF DESCRIPTION OF DRAWINGS

FIG. 2*a* is a front view showing the wheelchair transporter of FIG. 1*a*.

FIG. 2*b* is a rear view showing the wheelchair transporter of FIG. 1*a*.

FIG. 3*a* is a bottom view showing a mounting structure used in the wheelchair transporter of FIG. 1*a*.

FIG. 3*b* is a side view showing the mounting structure of FIG. 3*a*.

FIG. 3*c* is a front view showing the mounting structure of FIG. 3*a*.

DETAILED DESCRIPTION OF THE PREFERRED EMBODIMENTS

Figure 1A:
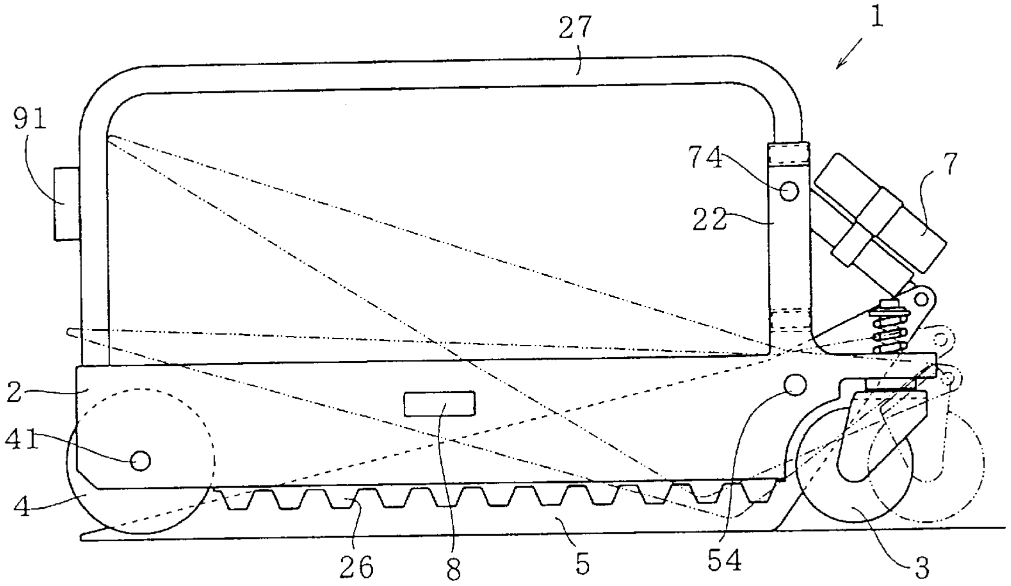
FIG. 1*a* is a side elevation showing a wheelchair transporter constructed according to the present invention.

Referring to FIGS. 1*a*–2*b*, a wheelchair transporter 1 of the present invention comprises a main body 2, a pair of front wheels 3,3, a pair of rear wheels 4,4, a mounting structure 5 inclinable with respect to the main body 2, an electric cylinder 7 connected with one end of the mounting structure 5, a pair of light reflecting plates 8,8 provided on both sides of the main body 2.

In detail, the main body 2 comprises a pair of elongate side frame members 21,21 provided on opposite sides of the transporter, a pair of vertical frame members 22,22 standing on the elongate side frame members 21,21, a pair of lateral frame members 23,23 extending between the vertical frame members 22,22, a pair of vertical frame members 24,24 extending between the lateral frame members 23,23.

Figure 1B:
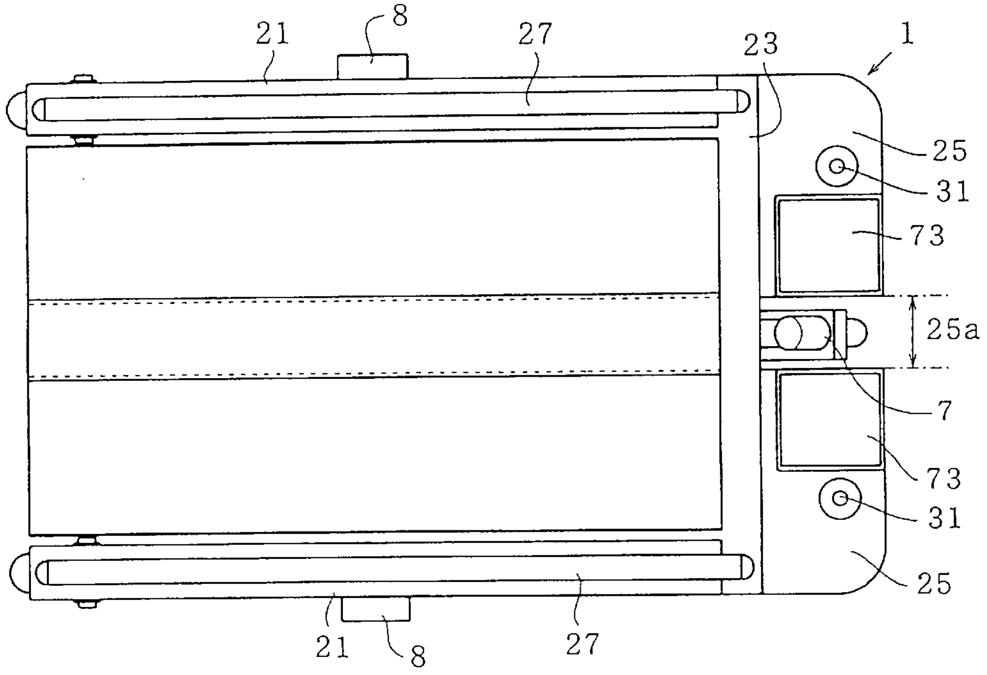
FIG. 1*b* is a top plane view showing the wheelchair transporter of FIG. 1.

As shown in FIGS. 1*b* and 2*a*, a pair of plate members 25,25 are provided on the front side of the transporter main body 2, with a space 25*a* (FIG. 25*a*) formed therebetween.

Referring again to FIG. 2*a*, attached along the lower edge of each elongate side frame member 21 is an elongate resilient member 26 (FIG. 1*a*) made of a rubber or a resin. Each elongate resilient member 26 is formed on its out surface with a plurality of lugs which are disposed at a predetermined interval to properly engage with steps of an escalator.

Referring to FIGS. 1*a* and 1*b*, a pair of handrails 27,27 are provided on both sides of the transporter main body 2. Such handrails 27,27 are used not only to prevent a wheelchair from falling out of the transporter 1, but also to serve as handles for a person (other than a person sitting on the wheelchair) to grip thereon when operating the transporter. Further, a manual switch 91 is provided on one handrail 27.

Referring again to FIG. 1*b*, each handrail 27 is provided with a light reflecting means 8 at the middle portion thereof, which is used to reflect a light emitted from a light emitting/detecting means (which will be described later).

Referring to FIG. 2*a*, each of the front wheels 3,3 is constructed into a caster supported by an upright rotatable shaft 31 which is inserted through one of the plate members 25,25. Mounted on the upright rotatable shaft 31 is a snap ring 32, a washer 33 and a coil spring 34. In detail, one end of the coil spring 34 is pressing against the washer 33, the other end of the coil spring 34 is fixed on the plate member 25. In further detail, the snap ring 32, the washer 33 and the upper end of the coil spring 34 are so connected with the rotatable shaft 31 that they are rotatable integrally at the same time. If the wheel 3 and the upright rotatable shaft 31 are caused by an external force to rotate horizontally, causing the coil spring 34 to twist to some extent, they will return to their original positions by virtue of a restoring force of the coil spring 34. In this way, the front wheels 3,3 may be constantly maintained in their straightly advancable positions.

With the use of the above structure, when travelling on a horizontal flat floor, the front wheels 3,3 are rotatable in a horizontal plane, thus permitting the wheelchair transporter 1 to change its travelling direction. On the other hand, when the wheelchair transporter 1 is mounted on and moved by an escalator, the front wheels 3,3 may be maintained in their straightly advancable positions as shown in FIG. 2*a*, even when the front wheels 3,3 are in their horizontally freely rotatable conditions (indicated by dotted lines on FIGS. 6 and 7), by virtue of a restoring force of the coil springs 34. Therefore, when an escalator mounting the wheelchair transport 1 transits from an inclined position to a horizontal position on a way of moving up, the wheelchair transporter 1 can smoothly move from the escalator to a horizontal floor with the effect of the front wheels 3,3 kept in their straightly advancable positions, thus effectively preventing the wheelchair transporter 1 from bumping into the left or right wall of the escalator. In fact, since each elongate side frame member 21 has a cross section of an inverted "U" as shown in FIG. 2*b*, a pair of rear wheels 4,4 may be partially received in the hollow portions of the side frame members 21,21.

Referring to FIGS. 3*a*–3*c*, the mounting structure 5 includes an L-shaped mounting plate 51 for mounting a wheelchair, a pair of side plates 52,52 provided on opposite sides of the mounting plate 51. Provided close to the middle position on the front side of the mounting plate 51 are a pair of upwardly projecting plates 53,53, which are connected at their upper ends with one end of an electric cylinder 7 (FIGS. 1*a* and 1*b*).

A light reflecting plate 8 may be alternatively provided at the center on the underside of the mounting plate 51. The light reflecting plate 8 is used to reflect a light being emitted from a light emitting/detecting means (which will be described later) provided at an entrance or exit of an escalator.

The mounting structure 5, constructed in the above-described manner, is pivotably supported on the transporter main body 2 by means of a pivoting shaft 54, such that a wheelchair may be easily moved onto the mounting structure 5 from the rear part thereof.

Referring to FIG. 1*a*, when the mounting structure 5 is in a horizontal position, it will get in contact with a ground surface, slightly raising the transporter main body 2 and thus causing the front wheels 3,3 and the rear wheels 4,4 to separate from the ground surface. Under such a condition where the transporter 1 is in a fixed unmovable state, a wheelchair may be safely and smoothly moved onto the mounting structure 5 without any trembling or vibration.

On the other hand, when the mounting structure 5 is caused to pivot upwardly about the pivoting shaft 54 from its horizontal position to its upwardly inclined position, the transporter main body 2 will be lowered slightly so that the front wheels 3,3 and the rear wheels 4,4 become in contact with the ground surface. Thus, the wheelchair transporter 1 is allowed to travel on the ground.

Referring to FIG. 3*b*, an inclination sensor 6 is provided on the upwardly projecting plates 53,53. As shown in an enlarged part of FIG. 3*b*, the inclination sensor 6 includes a first inclination sensing element 61 and a second inclination sensing element 62.

The first inclination sensing element 61 is a tubular member having at one end thereof a pair of electrically conductive terminals 61*a*, 61*b*. Similarly, the second inclination sensing element 62 is also a tubular member having at one end thereof a pair of electrically conductive terminals 62*a*,62*b*. Each of the tubular members contains a flowable mercury material 61*c* or 62*c* having a predetermined quantity sufficient to make contact between the terminals 61*a* and 61*b* or between the terminals 62*a* and 62*b*. When the mercury material 61*c* or 62*c* gets in touch with the terminals 61*a* and 61*b* or the terminals 62*a* and 62*b*, the terminals 61*a* and 61*b* or the terminals 62*a* and 62*b* will become electrically conductive with each other. As a result, a motor (not shown) for driving the electric cylinder 7 will be energized, which will be described in more detail later.

Referring again to the enlarged part of FIG. 3*b*, the first inclination sensing element 61 is arranged to form an angle $\alpha$ with a horizontal line. Preferably, the angle $\alpha$ is 8 with the right end of the element 61 being higher as indicated in the drawing. Further, the second inclination sensing element 62 is arranged to form an angle $\beta$ with an extended line of the first inclination sensing element 61. Preferably, the angle $\beta$ is 8°, with the right end of the element 62 being higher as indicated in the drawing.

The electric cylinder 7 contains a motor 71. When the motor 71 rotates in a clockwise or counterclockwise direction, the cylinder 7 will provide extending or retracting movement. The electric power is supplied to the motor 71 from battery devices 73,73 mounted on the brackets 72,72, as shown in FIG. 2*a*.

Referring again to FIGS. 2*a* and 2*b*, one end of the electric cylinder 7 is pivotably connected on a shaft 74 disposed between two vertical frame members 24,24, whilst the other end of the electric cylinder 7 is pivotably connected on a shaft 75 disposed between the two upwardly projecting plates 53,53. When the cylinder 7 is in its extending movement, the two upwardly projecting plates 53,53 will pivot downwardly about the shaft 54 (FIG. 1*a*), causing the mounting structure 5 to incline upwardly with respect to the transporter main body 2.

Figure 4C:
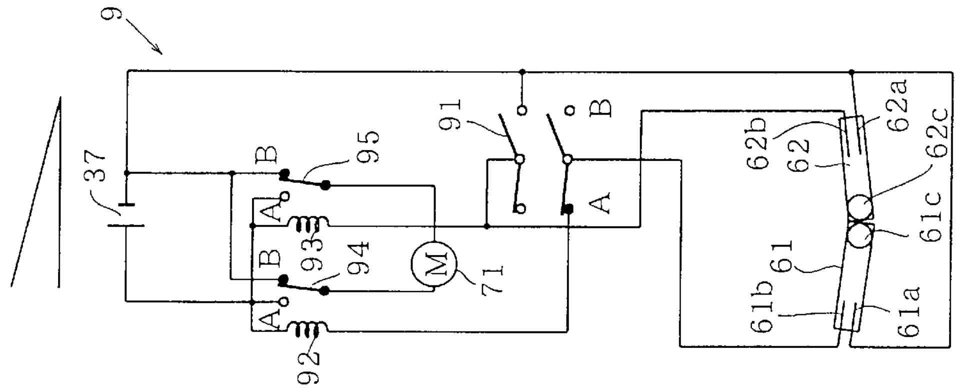
FIGS. 4*a*–4*h* indicate electric circuits for controlling the pivoting movement of the mounting structure used in the wheelchair transporter of FIG. 1*a*.
Figure 4B:
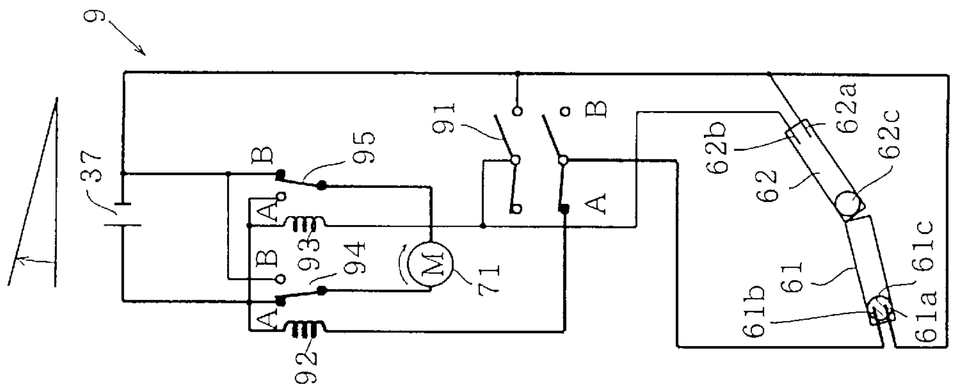
Figure 4A:
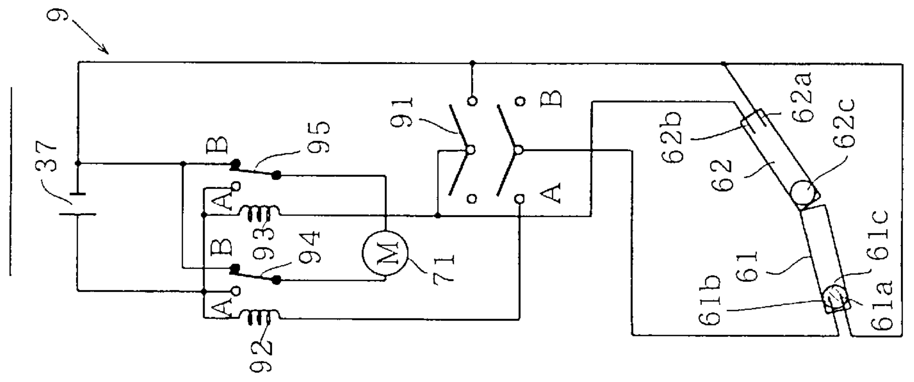

An electric circuit 9 in connection with the first and second inclination sensing elements 61 and 62 is indicated in detail in FIG. 4*a*. As illustrated in FIG. 4*a*, the electric circuit 9 includes the terminals 61*a*,61*b*,62*a*,62*b*, a battery 73, a motor 71 which is used for driving the electric cylinder 7. The circuit 9 further includes a manual switch 91, electromagnetic coils 92, 93, change-over switches 94 and 95 operated by the electromagnetic coils 92, 93. In fact, the change-over switches 94 and 95 are normally in contact with points B in the circuit.

The operation of the wheelchair transporter 1 will be described in detail below with reference to FIGS. 4*a*–4*h* and FIGS. 5–7.

When a wheelchair with a person sitting on travels on a horizontal floor and approaches an escalator, the wheelchair transporter 1 is at first moved to a position in front of the entrance of the escalator. Then, the wheelchair with the person sitting on is moved onto the mounting structure 5 of the wheelchair transporter 1. At this moment, since the mounting structure 5 is in its horizontal position, the front wheels 3,3 and the rear wheels 4,4 are separated from the ground surface. Thus, the transporter 1 is kept at a fixed unmovable state, enabling the wheelchair to be safely and smoothly moved onto the mounting structure 5 without any trembling or vibration.

Meanwhile, when the wheelchair transporter 1 is to be moved from the horizontal floor onto an escalator, the manual switch 91 (attached on a handrail 27, see FIG. 2*b*) is switched ON (FIG. 4*b*). This time, since the first inclination sensing element 61 is in a position having an angle ( $\alpha=8°$) with a horizontal line, the mercury material 61*c* will move downwardly to touch with the terminals 61*a* and 61*b* located at one end of the tubular member (FIG. 4*b*), therefore the terminals 61*a* and 61*b* become electrically contact with each other. Thus, as shown in FIG. 4*b*, since the manual switch 91 is ON (in contact with side A), the electromagnetic coil 92 will be energized to generate a magnetic attraction force, so as to cause the change-over switch 94 to get in contact with side A. Consequently, the motor 71 will begin to rotate in one predetermined direction so that the electric cylinder 8 will extend.

Then, as fast as the mounting structure 5 is pivoted upwardly to form an angle of 15° with transporter main body 2, the flowable mercury material 61*c* will move to the other end of the cylindrical member, so that the circuit 9 will be interrupted and the motor 71 will stop, as shown in FIG. 4*c*.

At this moment, the front wheels 3,3 and the rear wheels 4,4 are in contact with the ground surface, so that the wheelchair transporter 1 is in a movable condition and can start travelling.

Figure 5:
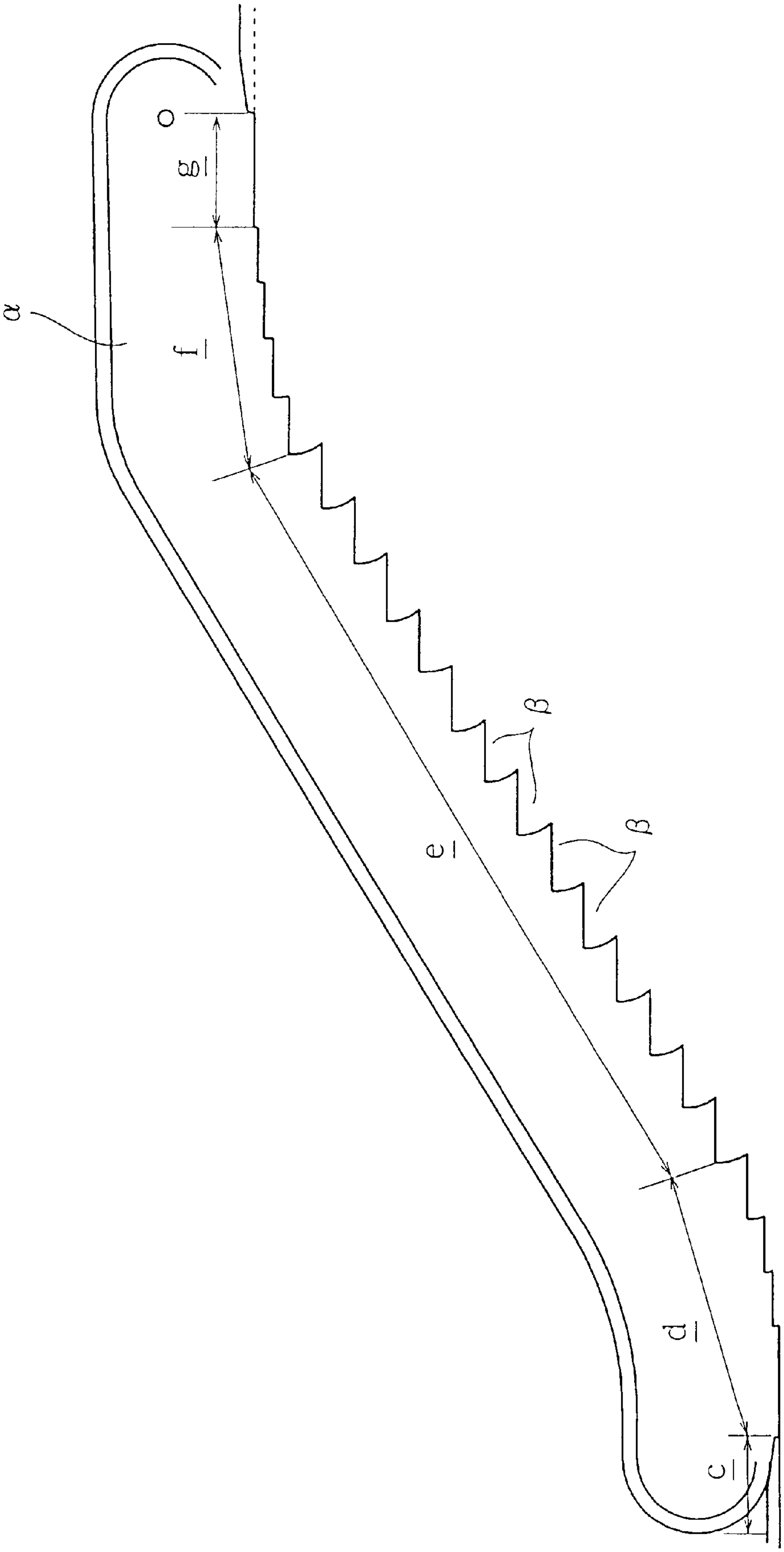
FIG. 5 is an explanatory view showing an escalator system on which the wheelchair transporter of the present invention will be mounted.

Next, the wheelchair transporter 1 is moved to a section c of an escalator α (FIG.5) with the front wheels 3,3 and the rear wheels 4,4 in contact with the steps β (FIG. 5). At this moment, since the mounting structure 5 is in an upwardly inclined position forming an angle of 15 with the transporter main body 2, the wheelchair mounted on the wheelchair transporter 1 will be surely in a horizontal position, so that a person sitting on the wheelchair will not have any terrible or uncomfortable feelings when the transporter 1 gets on the escalator.

When the wheelchair transporter 1 is moved further up the escalator a arriving at a further inclined section d, the mounting structure 5 will be pivoted upwardly still further.

Namely, as soon as the wheelchair transporter 1 is inclined into a further inclined position, the flowable mercury material 61*c* in the first inclination sensing element 61 moves back to get in touch with the terminals 61*a*, 61*b* again as that the circuit so that the circuit 9 is again energized and the motor 71 will begin to rotate again, thereby causing the electric cylinder 7 to extend still more, enabling the mounting structure 5 to pivot upwardly still further.

Generally, when the wheelchair transporter 1 is being moved up an escalator, the mounting structure 5 will incline rearwardly corresponding to an inclined condition of the escalator, but in the present invention this kind of rearwardly inclination may be completely prevented since the mounting structure 5 has already inclined upwardly forming an angle of 15° with the transporter main body 2.

Figure 4F:
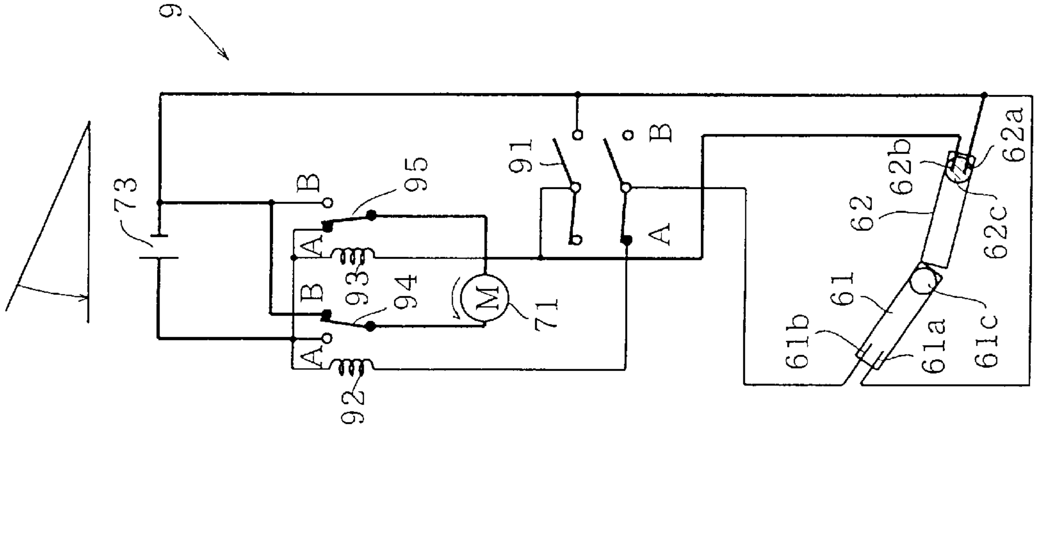
Figure 4E:
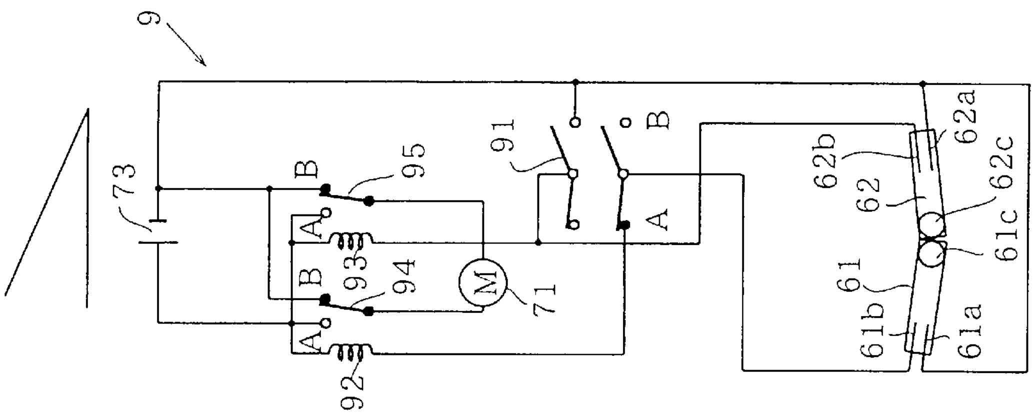
Figure 4D:
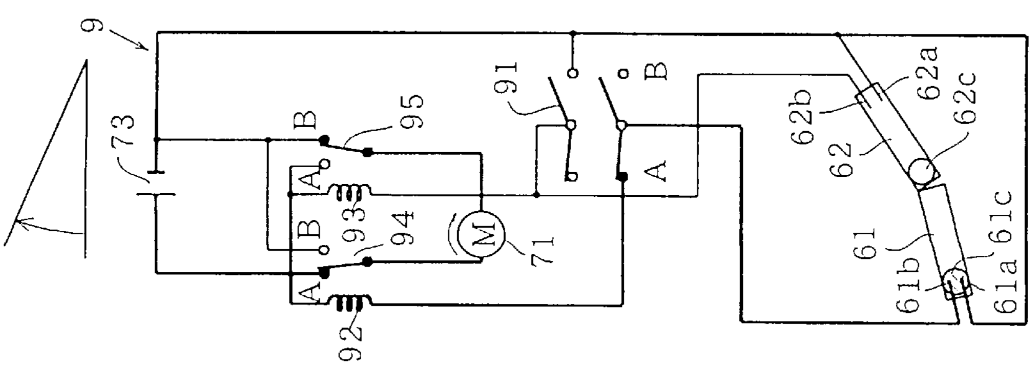

Referring to FIG. 5, when the wheelchair transporter 1 arrives at an area e on the escalator where the steps β are arranged along an inclined line having a constant angle with a horizontal line, the mounting structure 5 is disposed at least on a horizontal position. This time, as shown in FIG. 4*e*, the flowable mercury material 61*c* will move to the other end of the cylindrical member 61, so that the circuit 9 will be interrupted again and the motor 71 will stop.

Figure 6:
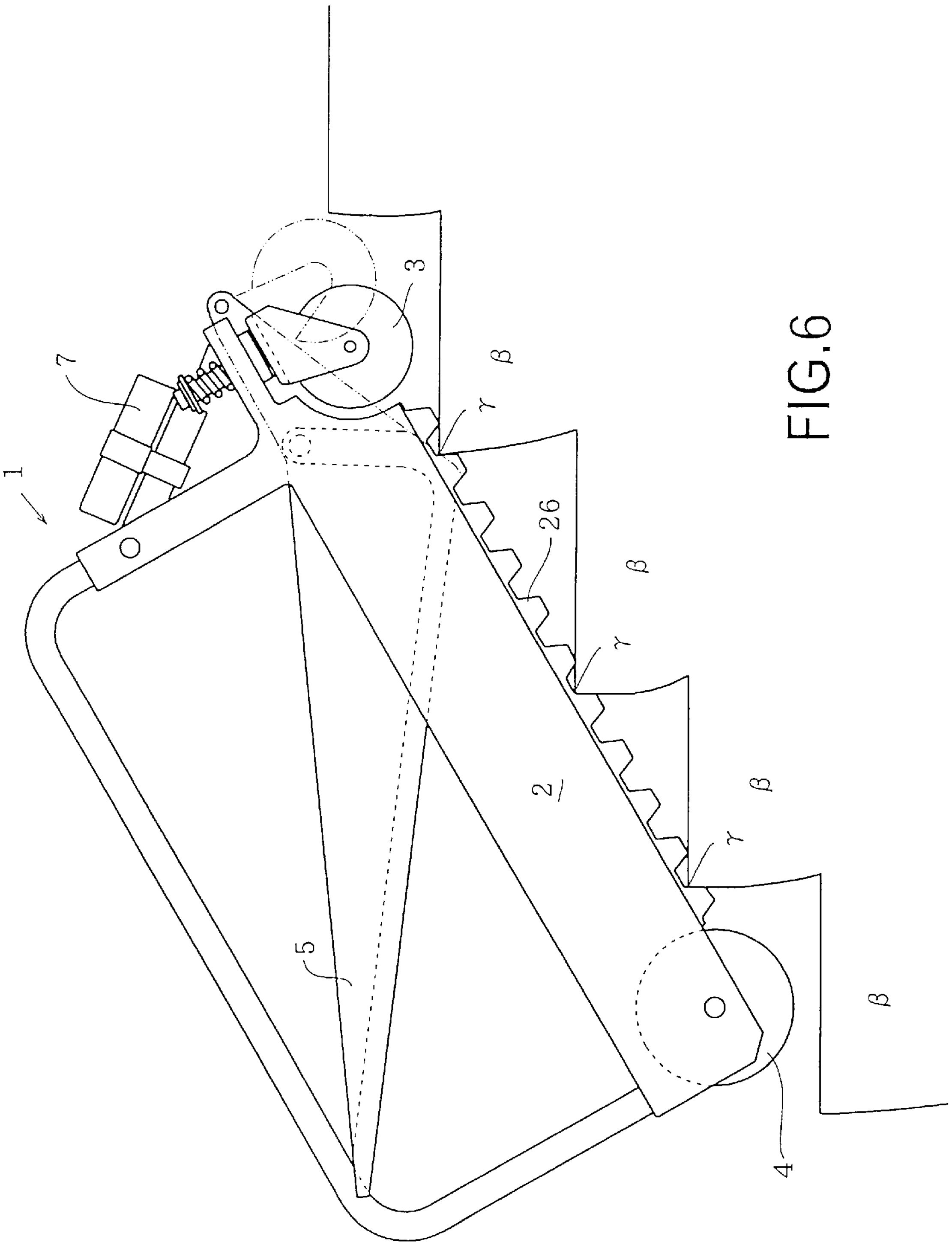
FIG. 6 is an explanatory view showing a condition where the wheelchair transporter of the present invention is mounted on and moved by an escalator system.

Referring to FIG. 6, when the wheelchair transporter 1 is moved through areas d, e, f on the escalator α, the elongate resilient members 26,26 attached along the lower edges of elongate side frame members 21,21 will get in contact with corners γ of the steps β of the escalator α. Accordingly, the wheelchair transporter 1 is exactly supported on the moving escalator α without any vibration or position displacement.

Figure 7:
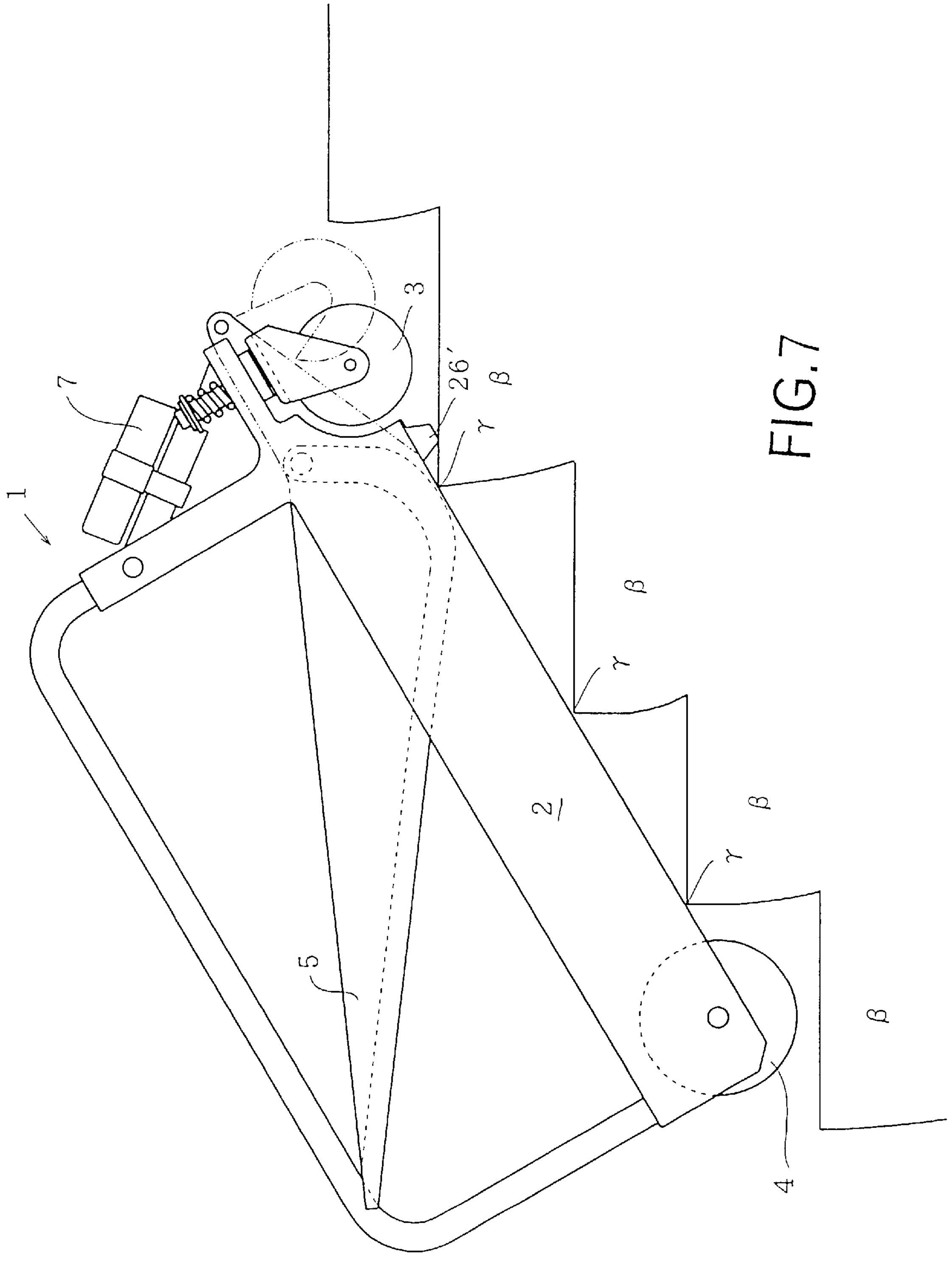
FIG. 7 is an explanatory view showing a condition where the wheelchair transporter of the present invention is stopped on an escalator system.

At this moment, referring to FIG. 7, the front wheels 3,3 and the rear wheels 4,4 are separated from the steps β and thus in a freely rotatable condition, with the front wheels 4,4 being constantly kept at their straightly advancable positions.

Referring again to FIG. 7, a stopper 26' is provided on the underside of the transporter main body 2. When the wheelchair transporter 1 is being moved through section d (FIG. 5) on the escalator α (where the escalator's inclination angle gradually becomes large), the stopper 26' may be operated to engage with the corner γ of a step β, so that the wheelchair transporter 1 may be exactly stopped without any undesired rearward movement.

When the wheelchair transporter 1 is being moved through section f (FIG. 5) on the escalator α (where the escalator's inclination angle gradually becomes smaller), the flowable mercury material 62*c* will move to the other end of the cylindrical member 62 (FIG. 4*f*), permitting electrical contact between terminals 62*a* and 62*b*. In this way, as shown in FIG. 4*f*, the circuit 9 is energized and the electromagnetic coil 93 will generate magnetic force to attract the change-over switch 95 to the side A. Thus, the motor 71 will begin to rotate in an opposite direction to cause the electric cylinder 7 to retract, thereby causing the mounting structure 5 to gradually return to a horizontal position.

Further, as fast as the wheelchair transporter 1 arrives at section g on the escalator α, the mounting structure 5 will be returned to its initially inclined position (as in a position when the transporter 1 arrives at the section c on the escalator α), the flowable mercury material 62*c* will move back to its original position in the cylindrical member (FIG. 4*g*), thus the circuit 9 is interrupted and the electric power supply is shutoff.

Then, the front wheels 3,3 and the rear wheels 4,4 get into contact with the steps β on the section g, the wheelchair transporter 1 is thus enabled to travel on a horizontal floor. This time, since the front wheels 3,3 are kept at their straightly advancable positions by virtue of the springs 34,34, the wheelchair transporter 1 is able to smoothly move out of the escalator α without any zigzag movement.

Figure 4H:
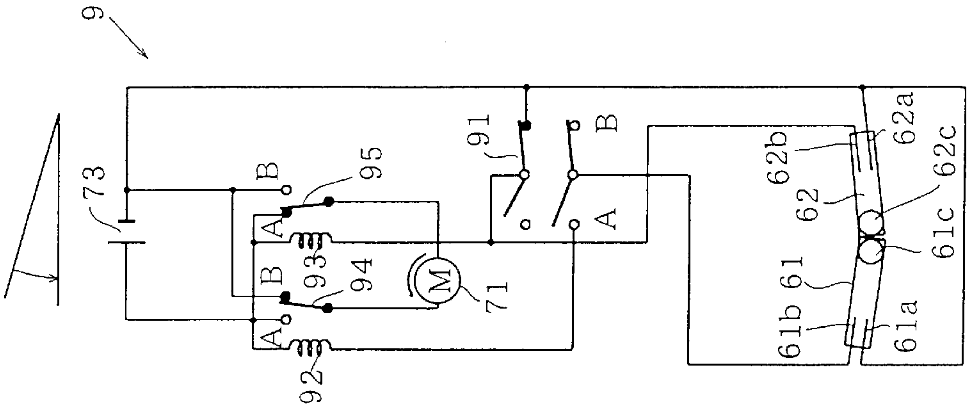
Figure 4G:
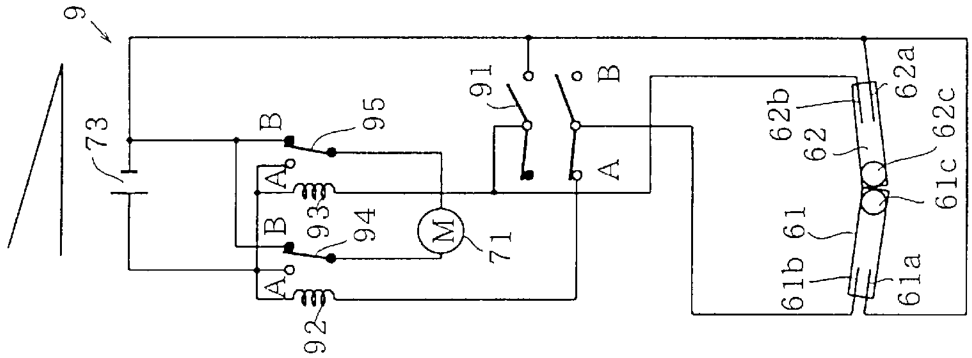

Afterwards, as shown in FIG. 4*h*, by switching off the manual switch 91 (by moving the switch 91 to side B), the motor 71 continues to rotate in the above opposite direction to cause the electric cylinder 7 to retract still further, thus causing the mounting structure 5 to change back to a complete horizontal position, enabling the wheelchair to easily move out of the wheelchair transporter 1.

As is understood from the above description, since the inclination sensing elements 61 and 62 employ flowable mercury materials 61*c* and 62*c*, it is allowed not only to ensure a highly reliable automatic operation in use, but also to reduce a cost by dispensing with commercially available but quite expensive inclination sensors.

Figure 8:
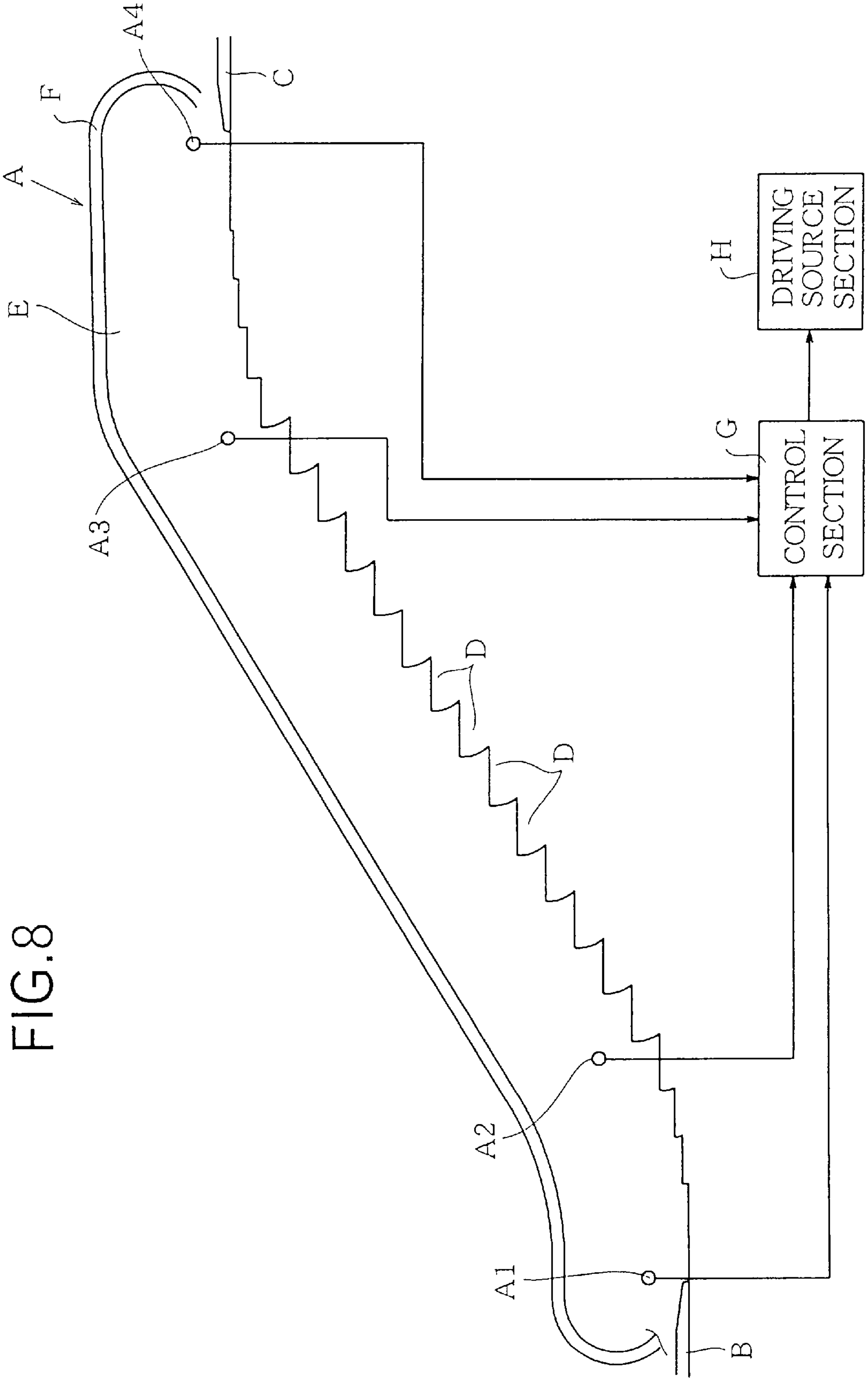
FIG. 8 is an explanatory view showing a first example of an escalator control system according to the present invention.

FIG. 8 is an explanatory view illustrating a fist example of an escalator control system according to the present invention.

Referring to FIG. 8, an escalator equipment A includes an entrance B, an exit C, a plurality of steps D connected in an endless manner, left and right side walls E, left and right belts F moving with the steps D. The escalator equipment A further includes a control section G for controlling the moving speed of the escalator A, a driving source section H for driving the escalator in accordance with signals coming from the control section G. Usually, the steps D of the escalator A moves at a speed of 30 m/min.

As shown in FIG. 8, several light emitting/detecting means A1–A4 are provided on the left or right side wall E. In detail, a first light emitting/detecting means A1 is located at a position close to the entrance B, a second light emitting/detecting means A2 is located at a position where a horizontal section of the elevator A has transited to an inclined section on the escalator. A third light emitting/detecting means A3 is located at a position where the inclined section begins to transit to another horizontal section on the elevator. A fourth light emitting/detecting means A4 is positioned at a position close to the exit C. As shown in FIG. 8, each of the light emitting/detecting means A1–A4 produces a signal to the control section G.

The operation of the escalator control system shown in FIG. 8 will be described in detail below.

At first, the wheelchair transporter 1 mounting a wheelchair is moved onto the entrance B of the escalator A. At this moment, a light coming from the first light emitting/detecting means A1 is reflected by a reflecting plate 8 provided on one side of the wheelchair transporter 1. The reflected light is detected by the light emitting/detecting means A1, thus a signal representing the reflected light is applied to the control section G so as to effect a deceleration in the driving source section H. At this time, the escalator A is controlled so that its speed is reduced from its normal speed of 30 m/min to a reduced speed of 15–20 m/min.

In this way, since the speed of the escalator A has been reduced, the wheelchair transporter 1 may be moved onto the escalator A smoothly and safely without any uncomfortable and terrible feelings for a person sitting on the wheelchair.

Then, when the wheelchair transporter 1 arrives at a position where a horizontal section has transited to an inclined section on the escalator A, a light from the second light emitting/detecting means A2 is reflected by a reflecting plate 8 provided on one side of the wheelchair transporter 1. The reflected light is detected by the light emitting/detecting means A2, thus a signal representing the reflected light is applied to the control section G so as to effect an acceleration in the driving source section H. At this moment, the escalator A is controlled so that its speed is changed back to its normal speed of 30 m/min.

When the wheelchair transporter 1 arrives at a position where the inclined section begins to transit to a horizontal section on the escalator A, a light from the third light emitting/detecting means A3 is reflected by a reflecting plate 8 provided on one side of the wheelchair transporter 1. The reflected light is detected by the light emitting/detecting means A3, thus a signal representing the reflected light is applied to the control section G so as to effect an deceleration in the driving source section H. At this time, the moving speed of the escalator A is reduced from its normal speed of 30 m/min to a reduced speed of 15–20 m/min.

At this time, since the moving speed of the escalator A has been reduced, the wheelchair transporter 1 can be moved out of the escalator A smoothly and safely without any uncomfortable and terrible feeling for the person sitting on the wheelchair.

At the moment the wheelchair transporter 1 moves out of the escalator A, a light from the fourth light emitting/detecting means A4 is reflected by a reflecting plate 8 provided on one side of the wheelchair transporter 1. The reflected light is then detected by the fourth light emitting/detecting means A4, thus a signal representing the reflected light is applied to the control section G so as to effect an acceleration in the driving source section H. In this way, the escalator A is controlled so that its speed is changed back to its normal speed of 30 m/min.

Figure 9:
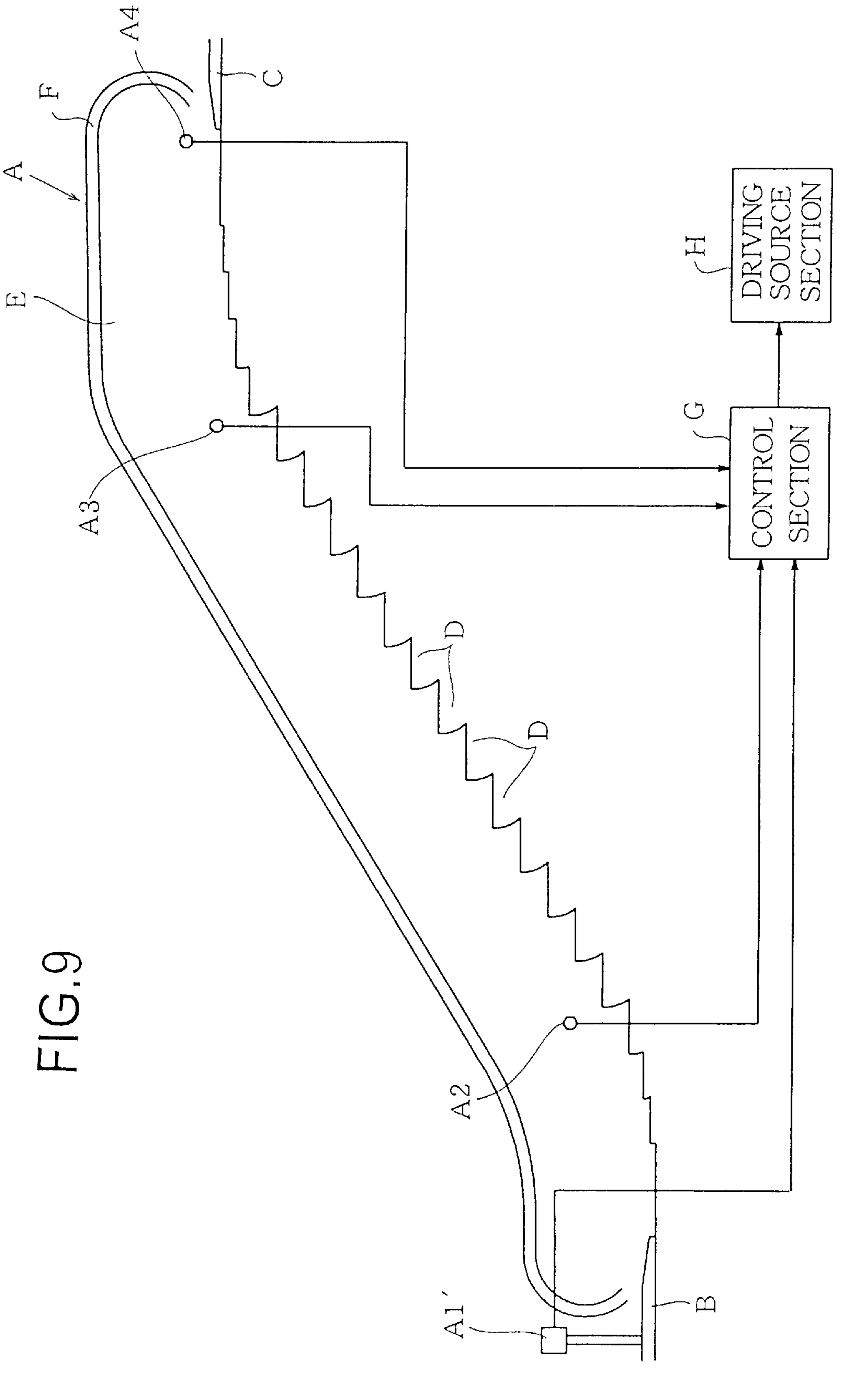
FIG. 9 is an explanatory view showing a second example of the escalator control system according to the present invention.

FIG. 9 is an explanatory view illustrating a second example of the escalator control system according to the present invention.

Referring to FIG. 9, the escalator control system shown in FIG. 9 is almost the same as that shown in FIG. 8, except that a manual change-over switch A1' is used to replace the first light emitting/detecting means A1. Similarly, as shown in FIG. 9, the manual change-over switch A1' and the light emitting/detecting means A2–A4 each produces a signal to the control section G.

In use of the escalator control system shown in FIG. 9, when the wheelchair transporter 1 carrying the wheelchair is moved on to the entrance B of the escalator A, the manual switch A1' is switched ON, thus a corresponding signal is applied to the control section G so as to effect a deceleration in the driving source section H. At this time, the moving speed of the escalator A is reduced from its normal speed of 30 m/min to a reduced speed of 15–20 m/min.

In this way, since the speed of the escalator A has been reduced, the wheelchair transporter 1 may be moved onto the escalator A smoothly and safely without any uncomfortable and terrible feelings for a person sitting on the wheelchair.

Then, when the wheelchair transporter 1 arrives at a position where a horizontal section has transited to an inclined section on the escalator A, a light from the second light emitting/detecting means A2 is reflected by a reflecting plate 8 provided on one side of the wheelchair transporter 1. The reflected light is detected by the second light emitting/detecting means A2, thus a signal representing the reflected light is applied to the control section G so as to effect an acceleration in the driving source section H. At this moment, the escalator A is controlled so that its speed is changed back to its normal speed of 30 m/min.

When the wheelchair transporter 1 arrives at a position where the inclined section begins to transit to a horizontal section on the escalator A, a light from the third light emitting/detecting means A3 is reflected by a reflecting plate 8 provided on one side of the wheelchair transporter 1. The reflected light is detected by the third light emitting/detecting means A3, thus a signal representing the reflected light is applied to the control section G so as to effect an deceleration in the driving source section H. At this time, the moving speed of the escalator A is reduced from its normal speed of 30 m/min to a reduced speed of 15–20 m/min.

At this time, since the moving speed of the escalator A has been reduced, the wheelchair transporter 1 can be moved out of the escalator A smoothly and safely without any uncomfortable and terrible feeling for the person sitting on the wheelchair.

At the moment the wheelchair transporter 1 moves out of the escalator A, a light from the fourth light emitting/detecting means A4 is reflected by a reflecting plate 8 provided on one side of the wheelchair transporter 1. The reflected light is then detected by the fourth light emitting/detecting means A4, thus a signal representing the reflected light is applied to the control section G so as to effect an acceleration in the driving source section H. In this way, the escalator A is controlled so that its speed is changed back to its normal speed of 30 m/min.

Figure 10:
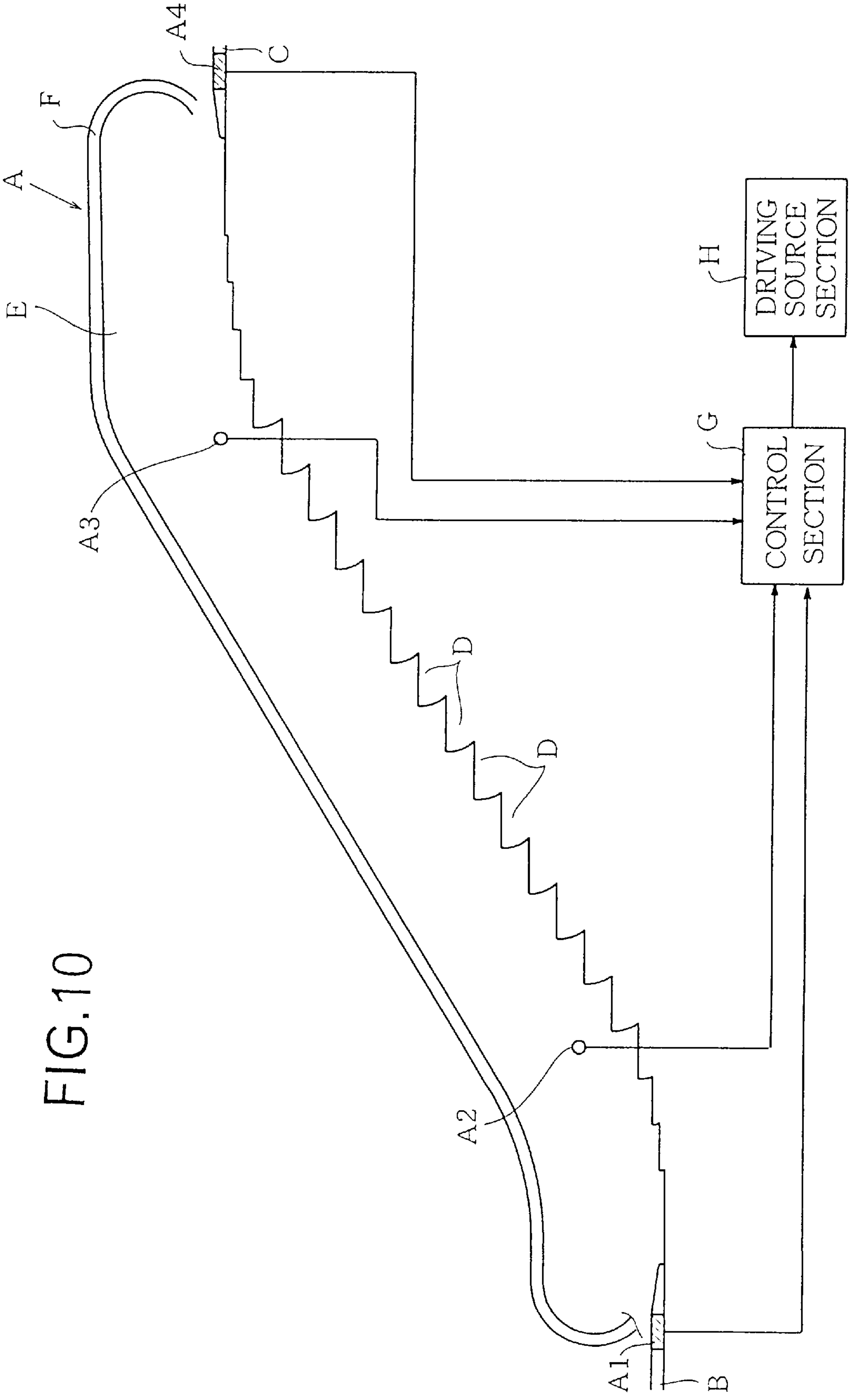
FIG. 10 is an explanatory view showing a third example of the escalator control system according to the present invention.
Figure 11:
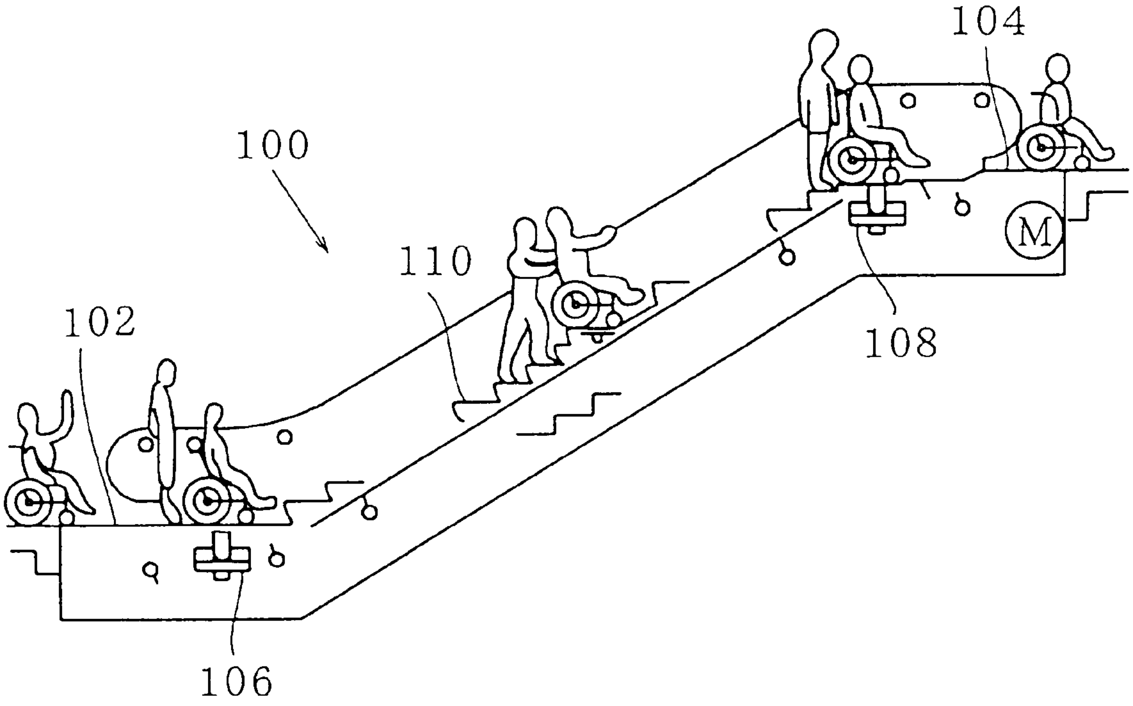
FIG.11 PRIOR ART
FIG. 11 is an explanatory view showing a conventional escalator system for transporting a wheelchair.

FIG. 10 is an explanatory view illustrating a third example of the escalator control system according to the present invention.

Referring to FIG. 10, the escalator control system shown in FIG. 10 is almost the same as that shown in FIG. 8, except that the first light emitting/detecting means A1 is positioned on the bottom surface of the entrance B of the escalator A, and that the fourth light emitting/detecting means A4 is positioned on the bottom surface of the exit C of the escalator A. Similarly, as shown in FIG. 10, the light emitting/detecting means A1–A4 each produces a signal to the control section G.

In use of the escalator control system shown in FIG. 10, when the wheelchair transporter 1 mounting the wheelchair is moved on to the entrance B of the escalator A, a light from the first light emitting/detecting means Al is reflected by the reflecting plate 8 provided on the underside of the wheelchair transporter 1. The reflected light is detected by the first light emitting/detecting means A1, thus a signal representing the reflected light is applied to the control section G so as to effect a deceleration in the driving source section H. At this time, the escalator A is controlled so that its speed is reduced from its normal speed of 30 m/min to a reduced speed of 15–20 m/min.

In this way, since the speed of the escalator A has been reduced, the wheelchair transporter 1 may be moved onto the escalator A smoothly and safely without any uncomfortable and terrible feelings for a person sitting on the wheelchair.

Then, when the wheelchair transporter 1 arrives at a position where a horizontal section has transited to an inclined section on the escalator A, a light from the second light emitting/detecting means A2 is reflected by a reflecting plate 8 provided on one side of the wheelchair transporter 1. The reflected light is detected by the light emitting/detecting means A2, thus a signal representing the reflected light is applied to the control section G so as to effect an acceleration in the driving source section H. At this moment, the escalator A is controlled so that its speed is changed back to its normal speed of 30 m/min.

When the wheelchair transporter 1 arrives at a position where the inclined section begins to transit to a horizontal section on the escalator A, a light from the third light emitting/detecting means A3 is reflected by the reflecting plate 8 provided on one side of the wheelchair transporter 1. The reflected light is detected by the third light emitting/detecting means A3, thus a signal representing the reflected light is applied to the control section G so as to effect an deceleration in the driving source section H. At this time, the moving speed of the escalator A is reduced from its normal speed of 30 m/min to a reduced speed of 15–20 m/min.

At this time, since the moving speed of the escalator A has been reduced, the wheelchair transporter 1 can be moved out of the escalator A smoothly and safely without any uncomfortable and terrible feeling for the person sitting on the wheelchair.

When the wheelchair transporter 1 moves out of the escalator A, a light from the fourth light emitting/detecting means A4 is reflected by the reflecting plate 8 provided on the underside of the wheelchair transporter 1. The reflected light is then detected by the fourth light emitting/detecting means A4, thus a signal representing the reflected light is applied to the control section G so as to effect an acceleration in the driving source section H. In this way, the escalator A is controlled so that its speed is changed back to its normal speed of 30 m/min.

While the presently preferred embodiments of the this invention have been shown and described above, it is to be understood that these disclosures are for the purpose of illustration and that various changes and modifications may be made without departing from the scope of the invention as set forth in the appended claims.

What is claimed is:

1. A wheelchair transporter for transporting a wheelchair on an escalator, said transporter comprising:

a transporter main body having a length extending over at least two steps on an escalator;

a pair of front wheels adapted to contact a floor and a step on an escalator;

a pair of rear wheels adapted to contact a floor and a step on an escalator;

a mounting structure for mounting a wheelchair, said mounting structure being pivotably supported on the transporter main body by a pivoting shaft; and an extending/retracting device connected with one end of the mounting structure for pivoting the mounting structure in a vertical direction;

wherein said pair of front wheels and said pair of rear wheels are mounted on said transporter main body such that positions where said wheels contact a floor are always below a bottom surface of said transporter main body;

wherein the front wheels and the rear wheels are adapted to wheel the transporter to get on or off the escalator, and are adapted to be separated from the steps of the escalator when the transporter is mounted on the escalator in an inclined position, and wherein the bottom surface of the transporter main body is adapted to contact the steps of the escalator when the transporter is mounted on the escalator in an inclined position.

2. The wheelchair transporter according to claim 1, wherein the transporter main body is adapted to be supported by corners of steps on an escalator when the transporter is mounted on the escalator in an inclined position.

3. The wheelchair transporter according to claim 1, wherein the mounting structure is adapted to pivot in a vertical direction to an extent such that the bottom portion of the mounting structure is in an upwardly pivoted position beyond a horizontal line.

4. The wheelchair transporter according to claim 1, wherein the bottom surface of the transport main body includes a resilient material having formed on the outer surface thereof a plurality of lugs which are disposed at a predetermined interval to properly engage with steps of an escalator.

5. The wheelchair transporter according to claim 1, wherein the transporter main body has on the underside thereof at least one stopper, which is adapted to engage on a step near the corner thereof so as to prevent the transporter from moving on the escalator.

6. The wheelchair transporter according to claim 1, wherein each of the front wheels is a caster supported by a rotatable shaft, which is wound by a coil spring useful for maintaining the caster in a straightly advancable position.

7. The wheelchair transporter according to claim 1, wherein the mounting structure is provided with an inclination sensor which is adapted to switch On or Off the extending/retracting device to maintain the surface of the mounting structure at a predetermined inclination.

8. The wheelchair transporter according to claim 7, wherein the inclination sensor includes a first inclination sensing element and a second inclination sensing element, each inclination sensing element is a tubular member containing a flowable electrically conductive material and a pair of electrically conductive terminals.

9. The wheelchair transporter according to claim 8, wherein the first inclination sensing element is inclined with respect to a horizontal line on the mounting structure to form an angle $\alpha$ between 7°–9°.

10. The wheelchair transporter according to claim 8, wherein the second inclination sensing element is inclined with respect to an extended line of the first inclination sensing element to form an angle $\beta$ between 7°–9°.

11. The wheelchair transporter according to claim 8, wherein the flowable electrically conductive material is mercury.

* * * * *